ELECTRICAL CONNECTING STRIP

Filed Oct. 4, 1949 6 Sheets-Sheet 1

INVENTOR
Paul Eisler
BY A. E. Odell
ATTORNEY

April 7, 1953 P. EISLER 2,634,310
ELECTRICAL CONNECTING STRIP
Filed Oct. 4, 1949 6 Sheets-Sheet 2

INVENTOR
Paul Eisler
BY A. E. O'dell
ATTORNEY

April 7, 1953 P. EISLER 2,634,310

ELECTRICAL CONNECTING STRIP

Filed Oct. 4, 1949 6 Sheets-Sheet 3

INVENTOR
Paul Eisler
BY A. E. O'Dell
ATTORNEY

April 7, 1953 P. EISLER 2,634,310

ELECTRICAL CONNECTING STRIP

Filed Oct. 4, 1949 6 Sheets-Sheet 4

INVENTOR
Paul Eisler
BY A. E. Odell
ATTORNEY

April 7, 1953 P. EISLER 2,634,310

ELECTRICAL CONNECTING STRIP

Filed Oct. 4, 1949 6 Sheets-Sheet 5

INVENTOR
Paul Eisler
BY A. E. O'dell
ATTORNEY

April 7, 1953 P. EISLER 2,634,310

ELECTRICAL CONNECTING STRIP

Filed Oct. 4, 1949 6 Sheets-Sheet 6

INVENTOR
Paul Eisler
BY A. E. Odell
ATTORNEY

Patented Apr. 7, 1953 2,634,310

UNITED STATES PATENT OFFICE 2,634,310

ELECTRICAL CONNECTING STRIP

Paul Eisler, London, England, assignor to Hermoplast Limited, London, England, a corporation of Great Britain Application October 4, 1949, Serial No. 119,556
In Great Britain October 5, 1948

10 Claims. (Cl. 173—324)

Figure 1:
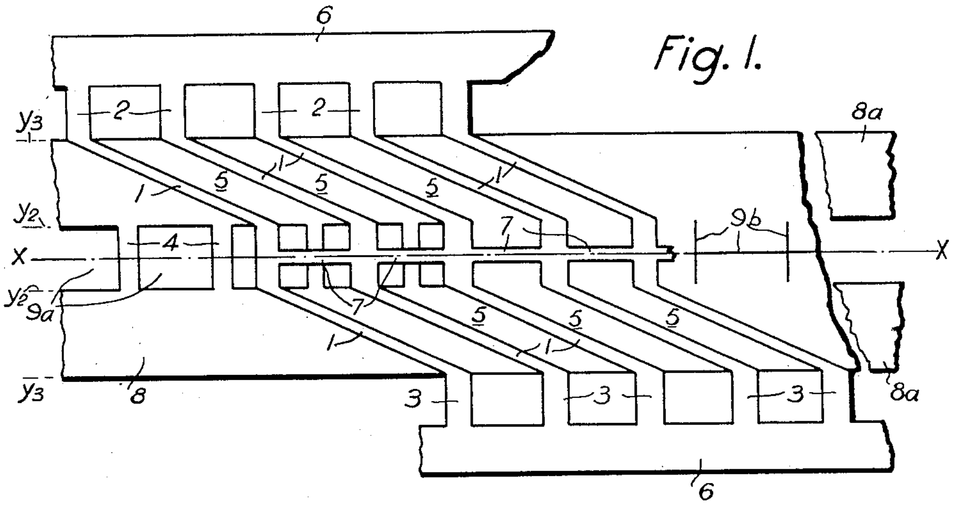

This invention relates to flat multi-conductor strips embodying a repeating pattern of conductive connections and an object of the invention is to provide a strip of this kind suitable for the connection in multiple of a succession of multi-membered assemblies of electrical components such as telephone switch-boards, relay-boards, indicator-boards or fuse-boards. Another object is to provide a strip of this kind which is not only suitable for the multiple connections of multi-membered switch-boards but which also incorporates actual switch contacts, thus eliminating a vast number of manually soldered connections on the built-up or already fully assembled equipment; the contacts may be arranged in rows of single contacts as in uniselectors, or in rows of pairs of contacts as in two-motion selectors or Strowger-type switches. A further object in the latter case is to provide the equivalent of twisting of the pairs of conductors and also to provide additional means for reducing or eliminating cross-talk and other undesirable effects due to interaction between conductors.

Still further objects are the provision of a strip which can be produced economically, which is reliable in use, which lends itself to simple installation, which avoids the possibility of erroneous connections, and in which the individual conductors are readily accessible for maintenance and repair.

Other objects of the invention will appear as the description proceeds.

In essentials, a strip according to the invention is produced as a flat strip and comprises a primary layer of insulation, a plurality of flat section conductive elements of substantially V-form held to the insulation with their axes transverse to the length of the strip with the two limbs of each element on opposite faces of the insulation and so spaced longitudinally of the strip as to form a plurality of groups of elements, each group being adapted to be associated with a unit set of terminals of the equipment to be connected and in each of which groups the end of one element overlaps the beginning of the next while each limb of an element crosses but is insulated from all other elements belonging to the group, and means mechanically and electrically binding together the corresponding elements of neighbouring groups into a series of elements with the joints on a line extending longitudinally of the strip, preferably at the said overlapping ends, whereby each series constitutes a separate insulated conductor of zig-zag conformation extending generally longitudinally of the strip but crossing it substantially from side to side on opposite faces alternately of said primary layer of insulation which extends over a plurality of groups so rendering the whole not only mechanically coherent even before the mechanical binding together of the elements into series but also predetermining and securing the register of the joints and the spacing of the corresponding elements of different groups.

It will be understood from the foregoing that a group comprises the group of conductors which are to be associated with the set of terminals of one unit of the equipment which is repeated at spaced intervals. Examples of such a set are one switch level of a uniselector switch, a fuseboard or a relay group. The term "sub-group" used herein refers to a number or set of elements making a partial repeat pattern within a group, more especially as regards the ends of the elements. The term "repeat" also used herein means one complete pattern which is repeated along the strip.

The invention also contemplates a method of making such a strip, which includes the steps of producing the conductive elements in the flat supported in juxtaposition to form a repeating pattern and folding the pattern about a primary layer of insulation along the mid-axis of the pattern whereby the two limbs of each element are brought on to opposite faces of the insulation, in the formation above set forth, if necessary securing the elements to the insulation and thereafter mechanically and electrically binding together the pairs of ends of the elements which have been overlapped by the folding step. In this procedure the pattern of the conductive elements can be produced on the insulation for instance by the methods described in my United States Patents 2,441,960, 2,582,685, and 2,587,568 or in pending applications Ser. No. 11,796, and Serial No. 11,797, filed February 27, 1948, by the known methods of so-called printed circuit technique. But I prefer to produce the conductive pattern from a separate metal foil as this enables elements of relatively stout gauge to be provided. Then the necessary supporting of the elements can be obtained by the production of a pattern in which the elements are not completely formed and separated before the folding step. The elements can for example be left with a continuous marginal portion of the conductive material joining their ends along both sides of the pattern, these continuous margins being subsequently removed. Similarly bridge pieces can be left between the elements at other places, to be removed subsequent to folding and securing the elements to the insulation.

The invention will be further described with reference to the accompanying drawings which illustrate some examples embodying it.

Figure 2:
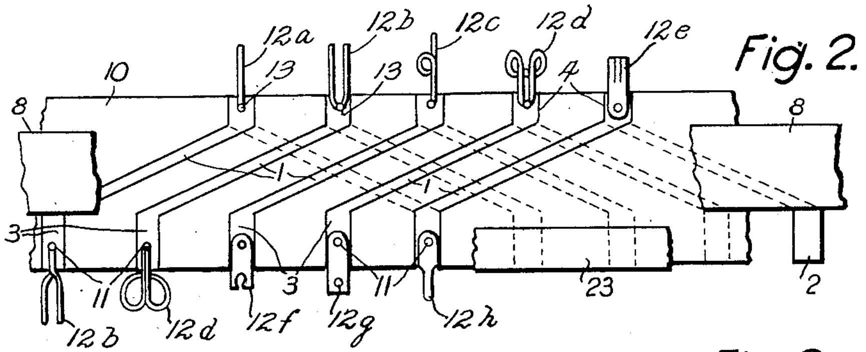
Figure 3:
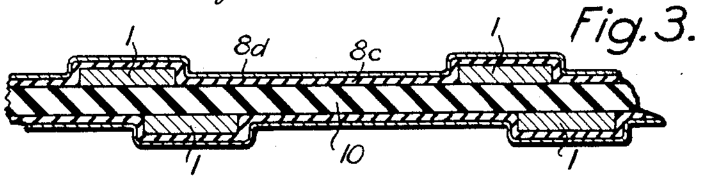
Figure 4:
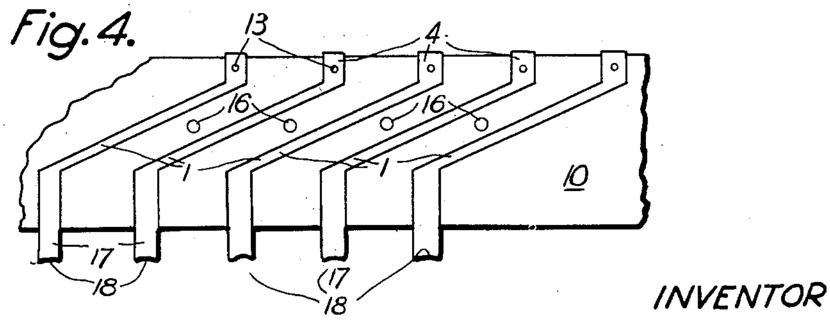
Figure 5:
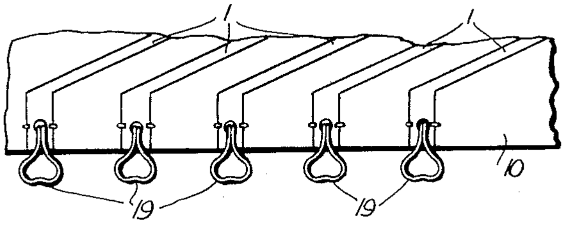
Figure 6:
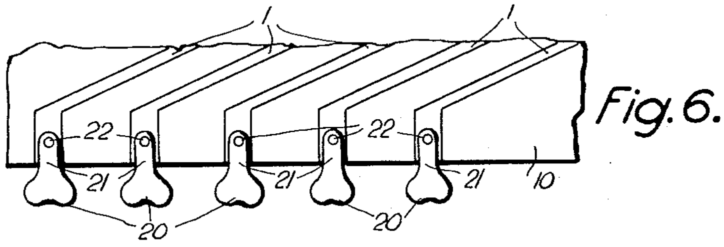
Figure 7:
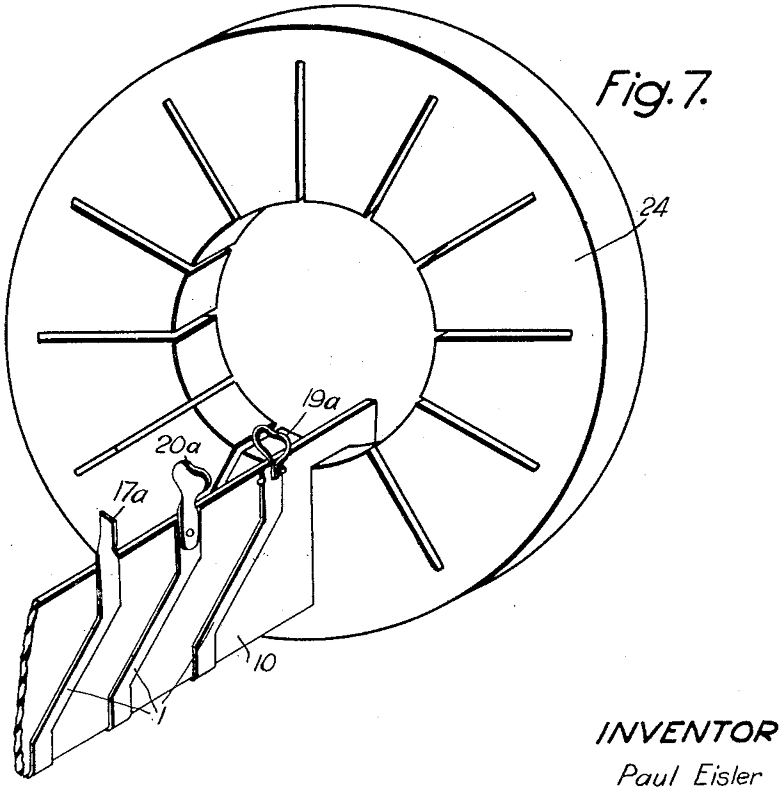
Figure 8:
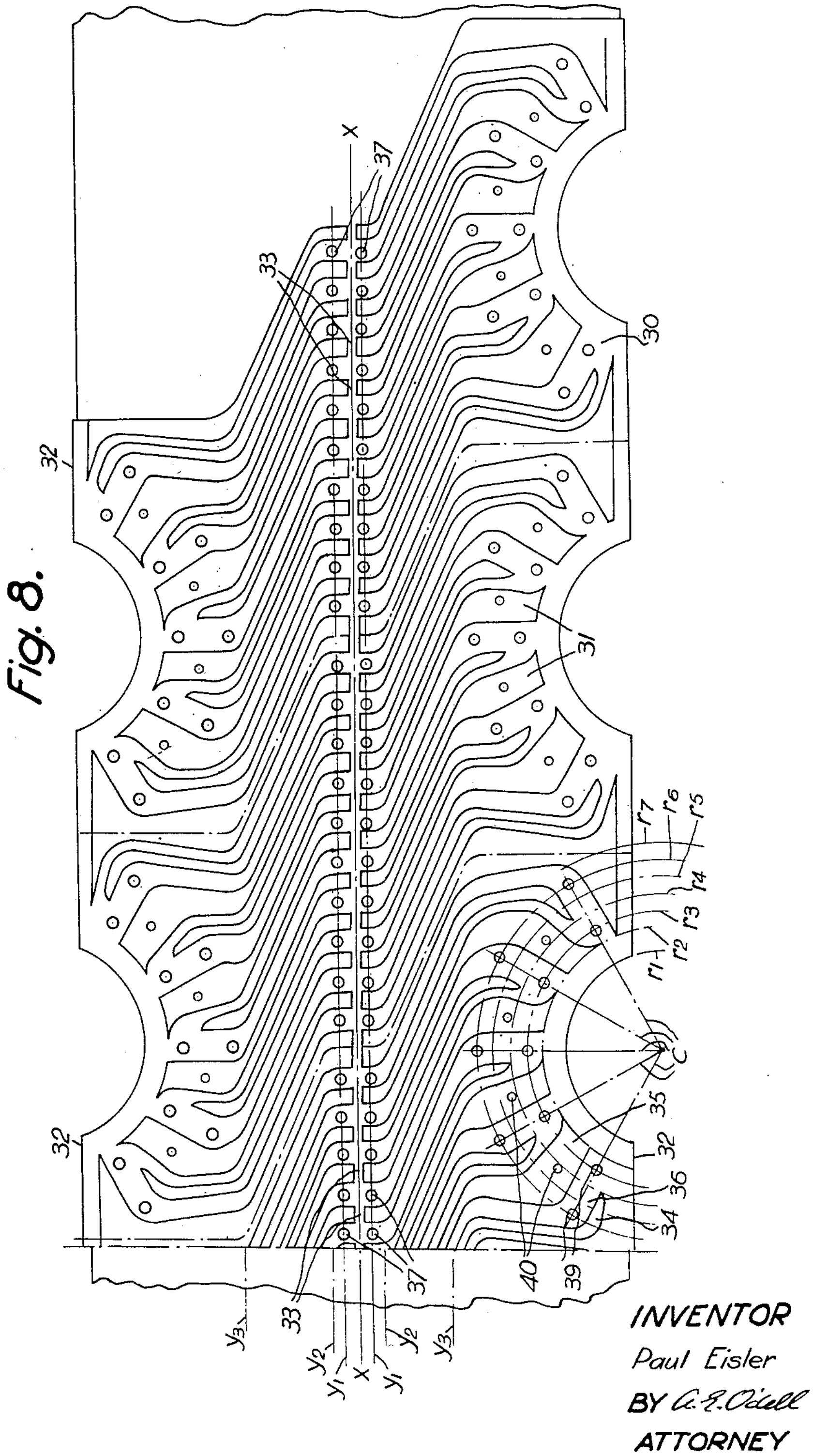
Figure 9:
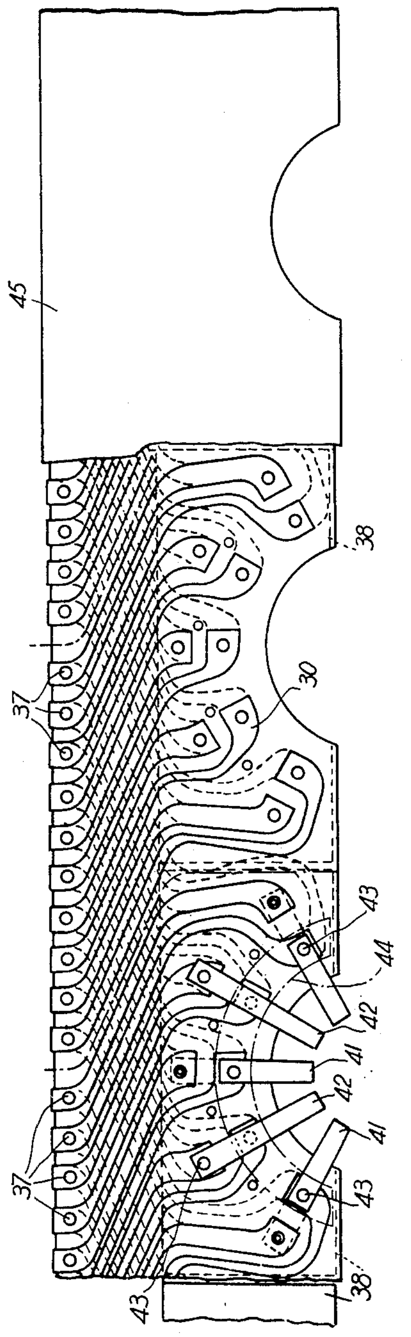
Figure 10:
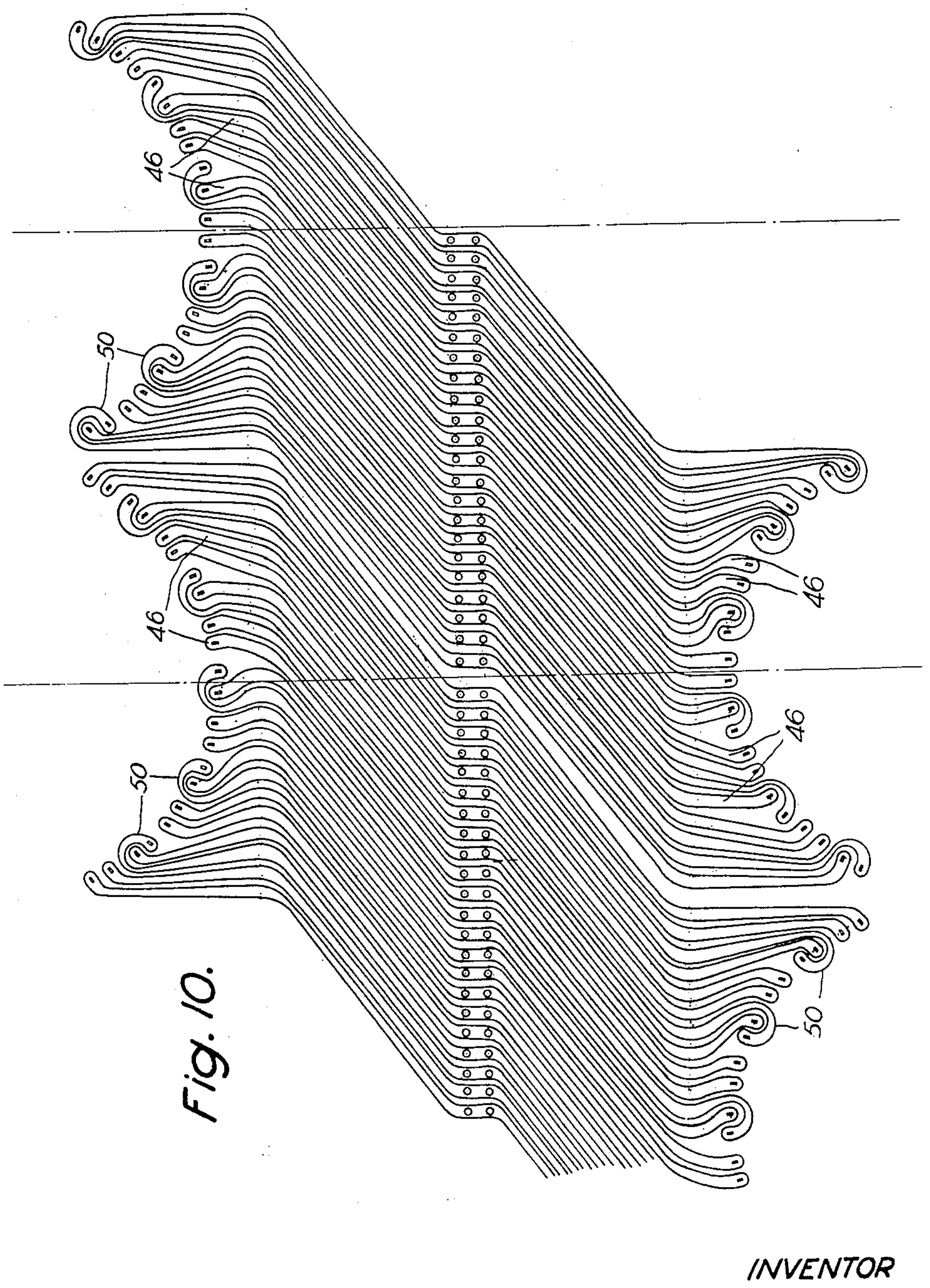
Figure 11:
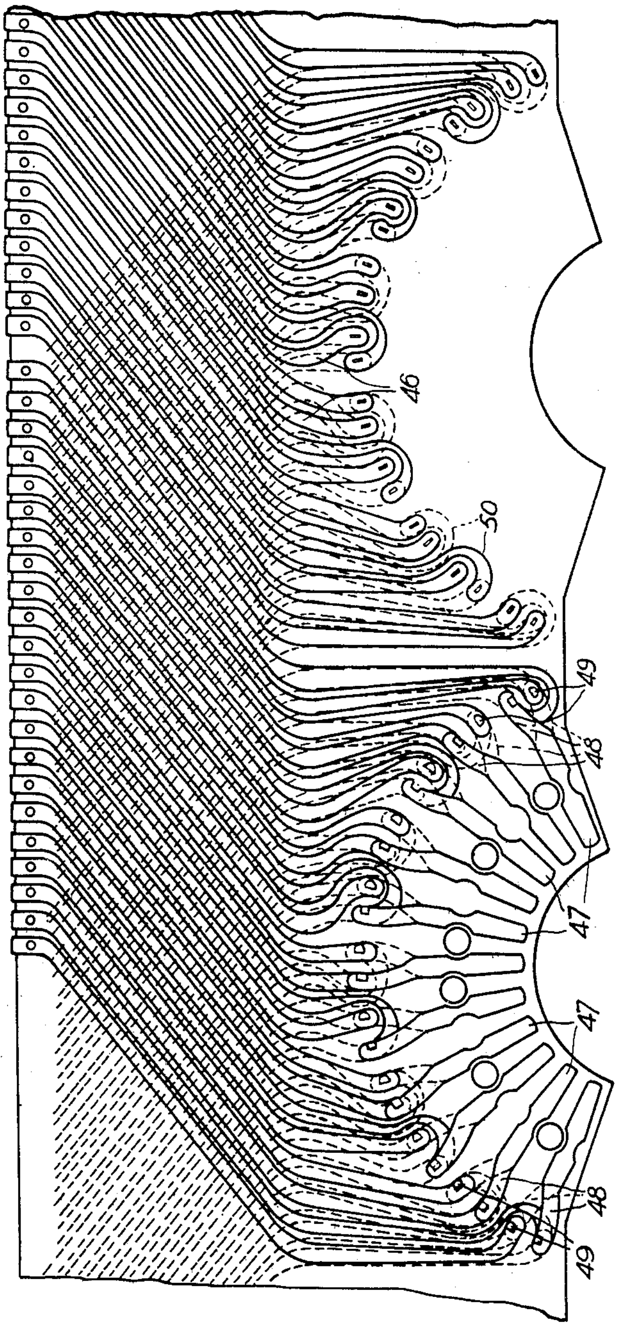

Figure 1 is a plan view showing a preparatory stage in the production of a first example, Figure 2 is a plan view of the first example when completed, Figure 3 is a detail longitudinal section of a modification, Figures 4, 5 and 6 are plan views of three forms of a further development incorporating actual switch contacts, Figure 7 is a perspective view of a form incorporating switch contacts, suitable for use in uniselector switch constructions, Figure 8 is a plan view showing a preparatory stage in the production of a third example, for use in the construction of two-motion selector switches, Figure 9 is a plan view of the third example when more nearly completed, Figure 10 is a plan view showing a preparatory stage in the production of a fourth example, again for use in the construction of two-motion selector switches, and Figure 11 is a plan view of the fourth example when more nearly completed.

The example shown in Figures 1 and 2 is a connection strip suitable for the interconnection for example of the terminals of uni-selector switch banks or other devices where the contacts belonging to a group are in a straight line and which it is permissible to connect without the conductors being arranged in twisted pairs.

The interconnection calls for a group of conductors running from one group of contacts of the first switch bank to the corresponding group of each successive switch bank, all contacts of the several groups, save for possible errors or changes in alignment, being in the same plane and in a straight line which is usually either vertical or horizontal. Other groups of contacts of the switches will be in parallel lines, respectively to one side of, or above or below the first mentioned group, and the contacts in a switch may be arranged on a cylindrical arc or in a plane according to the switch mechanism.

The first step is the production of a flat conductive, in general metallic, repeating pattern of elements 1. These elements run in general at an inclination to the longitudinal mid-axis of the pattern, which axis for convenience will be referred to as the $x$ axis, while the direction of the ordinates in the plane of the pattern at right angles to the $x$ axis will be refered to as the $y$ direction. The inclination of the elements is determined by the width of the strip, their own width and that of the gaps between them, their precise shape and the requirement that the beginning of each element should lie on the same $y$ ordinate as the end of the next element of the group which has to be connected in continuation of it when the strip is folded along the $x$ axis and the superimposed or overlapped beginnings and ends of elements are joined together through the strip. The elements are preferably not simply straight but have portions 23, running in the $y$ direction at the beginning and end, and another portion 4 running in the $y$ direction in the centre where they cross the $x$ axis, to facilitate the folding, the superposition, and joining.

The pattern so far described could be produced by the folded circuit technique described in Patent No. 2,441,960 and the metallisation of an insulating strip which can be folded along the $x$ axis can be effected by several of the known methods of printed circuit technique or according to my aforementioned patents and applications. It is however advantageous to produce the strips according to the present invention as follows:

A roll of metal foil wider than the extension of the elements in the $y$ direction is punched by a press tool so that slots 5 are formed in it corresponding to the gaps between the elements 1 of the pattern which in this punching stage emerge from the press as an incomplete but coherent pattern of elements joined together at their beginnings and ends by the margins 6, of the foil and if desired also by bridge pieces such as 7 along the $x$ axis or elsewhere.

Alternatively only slits may be made in the foil which is distorted by the press operation in such a way as to produce gaps such as 5 between the elements or slits may be made and parts of the foil be folded over along the elements to produce the gaps and give a double thickness of foil over the elements or part of the elements.

The next step which may be effected during the same press operation if desired, is to roll or press a strip or roll 8 of insulating material, e. g. adhesive paper or cloth, on to one or both sides of the slit or slotted metal foil on one or both sides so as to fix this partly patterned foil to the insulator or embed it in insulating material leaving however the beginnings 2, ends 3, and at least some parts of the centre of the elements uncovered as shown in Figure 1.

To this end the insulating material 8 is narrower than the foil and has slots 9$a$ or slits 9$b$ in the centre so that only the inclined portions of the elements are covered and if desired, some groups of the parts 4 crossing the $x$ axis. Slots in the insulating material make the centre portion of the respective elements directly accessible while slits form flaps which can be bent back for access to the centre portions of the elements. If it is desired to have the centre portions of all elements uncovered, two insulating strips 8$a$, 8$b$ on one or both sides of the foil are used side by side over the inclined portions of the elements only instead of the strip 8 with the slots or slits.

If bridge pieces such as 7 have been left in the centre portions of the foil they are now removed by punching and the foil partly covered with insulating material is folded along the $x$ axis over a strip 10 of insulating material coated with cement, e. g. a strip of laminate which will form the core of the whole connection strip. If it is desired to have the strip stiff over its whole length a stiff laminate is used as core. Alternatively a number of stiff strips each covering only the length of one group of elements are used as core if flexibility between the groups is desired. If a completely flexible strip is desired the foil is folded over a strip of flexible insulator. Such flexibility or flexibility at intervals enables small irregularities in the position of the equipment to be catered for. In general in the case of a simple connection strip as in Figures 1 and 2 a wholly stiff or a wholly flexible core will be used. In any case the width of this insulator 10 is only about half of that of the flat metal pattern. The first applied insulator 8 or 8$a$, 8$b$ forms a cover.

If the foil was embedded between two insulating strips or pairs of strips prior to being folded along the $x$ axis the under strip can constitute the core and it is possible to dispense with an additional core member unless it is desired for stiffening purposes or for shielding as described below. The foil, core and cover are fixed together by adhesives, or if the insulation is of suitable quality i. e. self-adhesive or thermoplastic by pressure or heat and pressure, so that they form a unit and the elements are securely located. It is possible to use moulded or embossed core strips to prevent any dislocation of the elements and it is also possible to use either metallised insulating strips or insulated metal strips as covers and core instead of the simple insulating strips described if it is desired to provide a great amount of shielding. In this case however care must be taken that there is always insulation between the foil and the shielding metallic areas. The latter may be made of metal foil and if they do not extend in width beyond the inclined portions of the elements no danger of accidental contact is likely.

If stouter metal strips are used they can be utilised to effect the stiffening of the strip partly or wholly where desired.

If screening by earthed core and cover metal is not sufficient as shown in Figure 3 the cover strip having a minimum but electrically reliable layer of insulation 8*c* between its shielding metal foil 8*d* and the elements may be embossed to extend the shield into the gap between the elements or it may actually be inserted between the elements instead of simply being rolled or pressed on. A similar variation may be employed for the core.

It is also possible to provide for screening in the plane of the pattern itself by increasing the number of elements in the foil up to an extra element next to each of the elements within the scheme of connections and connecting all the extra elements to earth by joints to the core or cover screen. The joints may be made either at the back edge or near the front edge of the strip and the core or cover screens be shaped accordingly to facilitate these joints. If it is not desired to let these extra shielding elements reach the front edge of the strip the development of the flat repeat pattern would provide for bridge pieces to make the extra elements cohere with the elements constituting the conductor scheme until the insulating strips are bonded on, the bridge pieces then being punched out.

Cover, foil and core having been secured together in a unit the margins 6 of the foil which still join the ends and beginnings of the elements are trimmed off so that all elements are now metallically separate but the portions of the elements which extend in the *y* direction namely the beginnings 2 and ends 3 and the centre portions 4 are now accurately superposed so that when a connection is made through the core the end of each element is joined conductively to the beginning of the next corresponding element of the next group so that the required scheme of connections is achieved.

The connections may be made merely by soldering or welding which in the case of the thermoplastic insulation can be effected without prepunching the insulation as the latter will simply disappear at the joint under the heat and pressure used to make the joint. In the case of soldered joints, a tinned foil may be used for the elements. Alternatively separate elements such as wire elements may be inserted through holes 11 and swaged before soldering or welding. It will be understood that where the insulation allows the holes need not be pre-punched but can be made by the separate fastening elements themselves. As explained below, at some or all of these junctions, connection members may also be attached.

It will be seen that the various elements are so connected as to produce a plurality of groups of conductors, each of which zig-zags across the strip substantially from one side to the other on opposite faces of the cores alternately while extending generally longitudinally. Also that any one limb of an element crosses but is insulated from one limb each of one element of every one of the others of the group on the opposite face of the core.

In Figures 1 and 2 the strip is intended to act as a connection strip, and it is therefore provided along one edge with a connection member 12 on every element. This edge which will be referred to as the front edge is conveniently but not necessarily the edge formed by the fold along the *x* axis. Such connection members may conveniently be wires, double wires, which are so formed as to be easily slipped over or tied to the solder tags of the selector switch and can be automatically inserted in holes 13 in the foil, swaged, and either welded or soldered to the foil. The foil itself may be tinned or plated copper or it may be tinned or plated only at the regions where the connection members are to be attached.

On the opposite edge to that on which the connection members 12 are provided, i. e. the back edge, other connection members 14 which may be of similar form may be provided. These are inserted in the holes 11 in the foil and similarly secured. Their purpose is not to form connection means to switch tags or the like but to permit interconnection of strips and they are generally only needed therefore at the ends of a strip for the first and last group of elements. If desired they may be provided at intermediate points as well, however.

Instead of the wire connection members 12, 14, any other convenient form of connection member may be used, for example tags 15 which are eyeletted or rivetted to the foil and also welded or soldered.

Figure 4 shows a construction in which the strip incorporates actual switch contacts. The general construction is similar to that above described with reference to Figures 1 and 2 and so far as it is similar need not be described again. The core or cover strips may as before be stiff, flexible, or stiff with flexible links. In addition holes such as 16 are provided for the passage of bolts to enable a number of strips to be stacked or arranged in an arc, according to the switch mechanism.

The principal difference over Figures 1 and 2 is that actual switch contacts are provided along one edge of the strip, instead of connection members for connection to terminals such as solder tags. This immediately eliminates a vast number of soldered joints having to be made manually during installation of the switches.

In Figure 4 the contacts 17 are formed of the foil itself. They protrude beyond the front edge of the core 10 and the cover omitted for the sake of clearness in this figure, and foil of substantial substance giving adequate strength must be used. It is preferably plated at least over those parts which form the contacts, and whether they are formed by the doubled centres or the overlapped beginnings and ends of the elements, the superposed protruding portions constituting the contact are soldered or welded together and may have a slight concave recess 18 in the centre. They may be edge plated after trimming and welding or soldering. No holes are required in these parts of the foil.

In Figure 5 the contacts 19 are formed of wire inserts. Thus the elements themselves may be of thin foil and wholly supported by the core 10. The wire, a silver wire for instance, may be bent into a shape resembling a heart and both ends of it passed through a hole in the overlapped parts of the element, here to be bent round and soldered or welded to form a good connection, at the same time forming a contact with appreciable elasticity.

In Figure 6 the contacts are of metal sheet comprising a heart shaped contact part proper 20 and a shank 21 formed into an eyelet 22 or it might be a flap which passes through a hole in the overlapped parts of the element, clinches these together and is welded or soldered to them. A stiff core, or a core stiff over the length of each group of contacts and extending right to the front edge of the strip is preferred here.

It will be understood that as in Figure 2 so in Figures 5 and 6 all contacts or wire ends may be automatically inserted and joined to the foil and that in some cases the making of the holes in foil and core for these elements may be effected in the same cycle of operations, i. e. if the core is of a nailable material the wires or formed sheet metal elements may be inserted without holes being previously made. They can make their own holes as a nail does and be soldered or welded to the foil element in the operating cycle.

The interconnection of the stacks of strips of neighbouring banks may be effected by similar connection strips which join on to ends of the back edge of the described strips which for that purpose may have suitable metal inserts instead of the wire ends or solder tags described.

By using two cover sheets as 8*a*, 8*b* instead of one with slots or slits forming flaps or by providing such slots or flaps for all groups of elements the foil may be made accessible all along the back edge of the strip and this is actually preferred as it provides a desirable maintenance feature enabling testing and some repair of all connections from the back of the rack carrying the banks. By soldering a wire between the respective elements at the back edge a connection at their front edge can be shunted and thus a break in it temporarily made good until it is convenient to get at the front edge, which means loosening the pressure on the stack of strips to move them apart sufficiently to allow work on the front contacts if one has to work from the back of the rack. This moving apart is facilitated by the use of strips which have only stiff cores of the length of a group of contacts and are flexible between same or which are constructed of flexible material throughout and assembled into a stack to form the switch stators by the aid of interleaved stiff insulating spacers which help in the location and support of the contacts.

If one cover sheet is used with slots or flaps leaving all elements at the back edge of the strip accessible the parts of the cover on the top and underside of the strip are attached together only through bridges at the relatively wide spaces between the groups of elements. As it may not be desirable to leave the back edge entirely uncovered a length of insulating tape 23 may be put on this edge, which can be removed when access to the back edge is wanted, that is in case of trouble or for test purposes. Where flaps are provided the tape is not required.

Figure 7 shows an important variation of the straight line contact strips shown in Figures 4 to 6 as applied to uni-selector switches. These switches carry contacts arranged in an arc and as the wiper moves along the arc, the contacts must be flat in the plane of the arc. A group of contacts to be connected by the strip is in a straight line perpendicular to the arc. Consequently contact strips for this type of switch are as indicated in Figure 7, stacked in a cylindrical arc round the switch axis and their contacts must be perpendicular to the plane of the switch. This is achieved by twisting the foils 17*a*, wire inserts 19*a* or metal inserts 20*a* forming the contacts through 90 degrees, at the edge of the strip or preferably using twisted inserts. The strips are assembled by the aid of ring-shaped and slotted spacers 24 guaranteeing accuracy of alignment.

Figures 8 and 9 show an example of a contact strip for use in two-motion selector banks which are usually arranged horizontally. Many of the features of this strip resemble those of the strips above described and may be produced in the same way and only the differences need detailed description.

Strips for two-motion selector banks are more complicated than those above described for two main reasons, namely (*a*) the contacts are not arranged singly in a straight line but in pairs—one on top of the other—and in an arc the centre of which is the brush or wiper axis, and (*b*) in order to eliminate cross talk the conductors running from pair to pair of consecutive contact groups must be given the equivalent of the twist which is used in the case of pairs of wire conductors.

According to the present invention these problems are again solved by the development of a scheme of connections into one flat layer of repeat connections and the folding of the flat pattern into a double layer strip with superposition of connection areas of the conductive elements, the contacts at the same time serving to join the elements or being made integral with the conductive elements. The contacts themselves may be of two different forms, or the same effect may be obtained by the use of an asymmetrical form of contact which can be used either way up.

In these cases of which Figures 9 and 11 show examples, the total of connections to one or more groups of contact pairs of one switch constitutes the repeat. The repeat will cover more than one group if the number of conductors in a group is not a multiple of the number of elements forming a sub-group. In such cases the number of conductors in the repeat will be the least common multiple of the number in a group and the number in a sub-group. Figures 8 and 9 show an example in which the number in a group is a multiple of the number in a sub-group so that one group is the minimum repeat, while Figures 10 and 11 show an example in which the number in a group is not a multiple of the number in a sub-group, so that the minimum repeat is more than one group, in this particular case as will be explained later, two groups. While the example shown in Figures 1 and 2 could, if desired, be so laid out that a tool suitable for punching but one slot between adjacent elements could be used to do all the punching required in the first stage, thus reducing the repeat, if not exactly to, practically and from a tooling point of view, to a one or two element pattern, the punching pattern in the present examples involves at least one repeat, i. e. one or more whole groups of elements over the whole length of one or more switches in one step or process as each of the elements in the repeat differs in shape from any other. The method of production however is on the same lines and the general construction of the strip is very similar to the previous examples. In view of the two additional problems set out above the flat pattern is produced as follows in the example shown in Figures 8 and 9.

A strip of metal foil 30, e. g. tinned copper foil, is punched so as to make a number of slots 31 in it, but leaving marginal parts 32 so that it is still a sufficiently coherent piece. If the slots are so long as to render the foil too flimsy they are interrupted by bridge-pieces 33 which are punched out at a later stage. It will usually be sufficient to leave such bridge-pieces apart from the—at this stage—necessarily coherent edge portion of the pattern only in the $x$ axis of the strip—but this depends largely on the thickness of the foil and the fineness of the pattern.

The metal between the slots constitutes the conductor elements, and the slots at this stage run so that the elements all merge into one another say on the upper edge of the foil along an arc, then run radially outward away from the centre of the arc until all are about the same distance in the $y$ direction from the $x$ axis. They continue at an angle towards the $x$ axis in more or less straight lines, cross the $x$ axis in the $y$ direction, and continue to the lower edge of the foil towards an arc spaced longitudinally from the upper arc by the distance of two neighbouring selector switches in the $x$ direction—at the same inclination so that the upper and lower halves of the foil are symmetrically reversed in relation to the $x$ axis. The full pattern at this stage would be obtained if the whole group of elements in the upper half of the foil were turned in its own plane 180 degrees round the centre of its crossing of the $x$ axis provided as is the case in view that the contacts are arranged in the stator of the selector switch symmetrically with respect to the $y$ direction.

The slots at the edges of the foil, that is on the arcs, are of two kinds. The odd ones 34 reach up to a distance of $r_4$ from the centre of the arc, the even ones 35 up to a distance of $r_2$. Consequently terminal parts of elements produced by the slots are alternately longer and shorter in the upper half of the foil and continue into shorter and longer terminal parts respectively in the lower half of the foil owing to the reverse symmetry of the pattern. It should be borne in mind here that there is always an even number of elements because there are pairs of contacts on the switch and consequently an odd numbered element of the upper half pattern continues with the shape of an even numbered element in the lower half pattern. Neighbouring odd and even elements belong to one pair and the slots are so shaped at the edges of the foil, that is on the arc, that both elements at this stage merge over a rectangle or similar form 36 between the distances $r_2$ and $r_7$ from the centre of the arc. At $r_2$ they merge into the full metal of the arc, at $r_7$ the elements already start to curve into their inclined straight part, or, if on the outside of the arc, still run radially outwards to curve into the inclined part when they are about as near the $x$ axis as the lines which come from the middle of the arc when the latter cross the $r_7$ circle. It is possible to make the shape of all pairs of slots the same over the whole pattern within the circle of $r_7$ or thereabouts and also to make the elements of substantially the same shape between the $x$ axis and a line $y_3$ parallel to the $x$ axis which is preferably at an only very slightly greater distance from the centre of the arc than $r_7$. Between this line $y_3$ and the $x$ axis the elements run straight but inclined and then at a distance of $y_2$ from the $x$ axis, turn into the $y$ direction to cross the $x$ axis. Each element has a small hole 37 in its centre portion at a distance from the $x$ axis on each side of the axis indicated by the line $y_1$ which is about half the distance of line $y_2$. These holes may be produced at a later stage of the process.

The general form of the repeat pattern between the parallel lines $y_3$ and the $x$ axis is generally much the same as that of the pattern of the earlier examples. Between the $x$ axis and the other edge of the foil the whole pattern described so far reappears turned through 180°.

The regularity of the elements within the areas defined above (inside the arc $r_7$ and between the $x$ axis and the lines $y_3$) greatly facilitates the building up of a punching tool but this advantage may sometimes not be fully utilised and an unequal spacing of elements or unequal width of elements or both may be arranged for between the $x$ axis and the lines $y_3$ in particular. It is apparent that a pair of elements starting from and ending in the centre of the arc is shorter than an outside pair. Where it is required to counteract this difference the width of the centre pairs and their spacings from neighbouring pairs may be made different from the widths and spacings of outside pairs. Thus an advantage in building up the tool for the repeat may be sacrificed to achieve more complete electrical equality of all pairs of elements.

Reverting to the rectangle 36 between $r_7$ and $r_2$ which joins the two conductors of a pair, it should be understood that this rectangle need not be a rectangle in the strict geometrical sense, but it is preferable for this area of the foil to have in the radial direction straight parallel sides equidistant from a radial line $c$ from the centre of the arc to the centre of this rectangle. This line $c$ is also the centre line of the contacts on the switch stator and as the contacts are equidistantly spaced round the arc of the switch so are the lines $c$. At a later stage of the process the contacts are joined to the conductors by rivetting and soldering at the points where line $c$ crosses the $r_3$ and $r_6$ circles. Previously however the pattern must be completed by removal of the bridge-pieces, the fixing of supporting and cover insulation, folding along the $x$ axis and so forth.

In the first stage the foil is punched so that the pattern described and shown in Figure 8 is repeated over the whole length of the strip. In this example there are but two types of element, i. e. two elements to a sub-group and as the number of elements in a group is even, i. e. a multiple of two, the minimum repeat is one group. The spacing of the repeat is usually regular and a little greater on the foil than the switch spacing to allow for creasing or bending of flexible strips.

The fixing of the punched foil—the coherence of which is still substantial in spite of the slots or slits described—to an insulating sheet or sheets or its bonding in between insulating sheets is the second main production step. There are many variations possible here. The foil may be fixed to one or two insulating cover strips extending between line $y_2$ and arc $r_7$ or line $y_3$ or to a supporting sheet over the whole foil area or only excluding the areas beyond $r_2$, or it may be bonded between such supporting and cover sheets, the latter being if desired foil covered, for screening. Flaps for the area between lines $y_2$—$y_2$ may be provided and in general all the constructional variations above described with reference to Figures 1 and 2 suitably modified may be applied.

The variety with stiff cores extending only over the length of a group of contacts and having a liberal flexible length between these groups is preferred and in order to make such a strip it is possible to bond the foil to a flexible supporting sheet say of impregnated paper or cloth which carries also a number of stiff rectangular insulating panels 38, e. g. of phenol-formaldehyde laminate a little longer than one contact group in the $x$ direction and extending from the foil edge to about the line $y_3$ in the $y$ direction. These panels are placed along one edge of the foil with the supporting sheet between foil and panels, the foil and supporting sheet are folded over along the $x$ axis and the whole bonded or stuck together. Thus a flexible strip with stiff sections is formed with the panels as stiff cores sandwiched between the supporting strips and the foil which is on the outside. If cement is used, which does not set hard when the strip is bonded together, care must be taken that the area of the stiff panel inside the $r_2$ circle remains free of cement or anything which may interfere with the wiper movement.

Alternatively, the supporting sheet without any panels attached to it, and the foil, may be fixed together and this combined sheet subsequently folded over and bonded to a series of separate and in this case already shaped panels. In this alternative, which is preferred, the step which follows the fixing of the supporting sheet to the slotted but still coherent foil, is the punching out of the bridge-pieces and like connecting areas which have been left in the foil, and of certain holes. These connecting areas are the area from the radius $r_2$ to the edge of the foil, the small part of the rectangles 36 between the radii $r_4$ and $r_5$ on both sides of the line $c$ and any other bridge-pieces between the elements which may have been left for instance at the $x$ axis to render the foil more coherent during the first punching stage. The holes preferably punched at this stage are those 37 in the centre position of the elements at the distance $y_1$ from the $x$ axis. Their register, when folded, need not be too accurate while the other holes on the radii $r_3$ and $r_6$ require good register with their counterparts on the other side of the $x$ axis and also with those in the core panels. The core panel makes the strip thicker here too and these holes are consequently not punched at this stage but later, together with therein the core panels. There is no core along the line $y_1$, and it is therefore preferable to punch the holes along this line at the same time as the punching away of the bridge-pieces, but to leave the holes on $r_3$ and $r_6$ for another step. The holes along $y_1$ are provided to facilitate the connection of wires to the strip for a temporary quick repair in case of a broken element or a fault developing between a contact and an element of the strip. These holes are along the back edge of the strip in a straight line $y_1$ and are easily accessible from the rear side of the rack, and permit the shunting of the fault by soldering a wire between the accessible back-end parts of the conductors affected. This maintenance possibility is one particular advantage of the invention.

The step following the punching away of the bridge pieces 33 and back-end holes 37 is the folding of the strip along the $x$ axis, the insertion of pre-punched stiff core panels 38 between areas $r_1$ and $y_3$ already shaped with the arc $r_1$, and of a length slightly more than a contact group, and the bonding of the assembly firmly and accurately together. Cover strips may be put on both sides in this stage as well or left for a later stage. The folding and bonding are effected by a tool or by means of a jig to ensure accuracy.

Now the holes 39 where the line $c$ crosses $r_3$ and $r_6$ and holes 40 for location and for the passage of bolts for assembling a number of strips into switch stators are punched. The holes 39 take the contacts. The holes are situated in register with the slots 31 of the foil between $r_2$ and $r_7$. The insertion of the contacts 41, 42 in the holes 39, and their connection to the foil on both sides of the strip is preferably done by an automatic machine. If done manually jigging is desirable although the holes may have been made so as to locate the contacts safely, because the accuracy of the contact position is of great importance to the working of the switch.

All contacts have a portion which forms an eyelet, flap, rivet or the like 43 fitting into the holes 39. An automatic machine may be used to feed and insert the contact rivets or the like into the holes 39 to swage them over flush and solder or weld them on to both sides of the foil. As in previous examples if the insulation permits the rivets or the like may themselves form the holes 39.

The long and short element ends involve two types of contacts, short and long respectively. They differ in length by the difference between $r_6$ and $r_3$. Their front end parts which extend into the ring beyond $r_1$ are identical.

The short contacts 41 are first inserted with their rivets or the like going through holes 39 on $r_3$. They are put in alternately on the top and bottom faces of the strip, one for each pair of connections, then an arcuate annular adhesive cloth or paper or other insulator 44 is fixed over the areas between $r_4$ to $r_2$ to insulate the swaged rivet ends or the like from accidental contact with the longer contacts 42 which now have their rivets or the like 43 inserted into the holes 39 on $r_6$ and swaged and soldered to the foil. The long contacts 42 are inserted at the positions left open by the short contacts 41 and are consequently exactly opposite the latter, one for every pair of connections distributed in alternating order on the top and bottom faces of the core of the strip.

If no cover sheets have been put on the strips so far, such sheets 45 with flaps over the areas $r_2$ to $y_3$ and $y_2$ to the $x$ axis may be put on now and the strips cut to the length of the bank of selector switches to be provided for. This cutting may be done best along the dividing line between successive repeats and along the $x$ axis. The strip is now complete and if the connections are followed it will be seen that every other top and every other bottom contact is alternately short and long. Further, the elements leading to the top and bottom contact of a pair are arranged parallel with one another on the strip. They change position from left to right alternately from switch to switch and every element which is longer on the top is shorter on the bottom of the strip and vice versa. Not only is nearly complete equality thus achieved in the pair, but as the neighbouring pairs of elements are made to alternate similarly but in opposition to one another, the effect of external fields set up by neighbouring elements is substantially cancelled out and the interaction of neighbouring elements is reduced at least as much as is achieved by the twisting of pairs of wire conductors in the orthodox bank wiring. This feature together with shielding by layers of metal foil on the cover sheet and if desired within the core and the possibility of giving the centre and outside elements different spacing and making them of different widths makes for a great improvement in cross talk elimination.

Figures 10 and 11 correspond with Figures 8 and 9 and are in general made in the same way and have the same advantages. In addition however, they use contacts of but one type. In this example the ends of the elements 46 corresponding with any pair of contacts, instead of being on the same radial line but at different radii from the switch arm axis, are on different radial lines on each side of the radial centre line of the contact but at equal radius i. e. they are spaced circumferentially. The contact members themselves comprise a contact proper 47, and a shank 48 which makes a slight angle with the part 47 so bringing its end to one side and by using these contacts the appropriate way up, the shank is brought into register with the proper pair of overlapped element ends. It can be mechanically and electrically attached to the element ends in any desired manner. In the example illustrated, the contact is formed with a tongue or flap 49 which is bent up, passed through a slot in the element ends, bent over and soldered or welded.

It will be noted that if the connections are followed through, this example is similar to that shown in Figures 8 and 9 in obtaining the effect of twisted pairs of conductors in orthodox wiring. This involves lateral change-over as between the opposite ends of any pair of conductors and this is effected by curving the ends 50 of certain of the elements 46 so that they pass round their neighbours. It will be seen however that in this example the use of one form of contact and the necessity to curve the end of every fourth element round every third element involves four different types of element i. e. in this example there are four elements per sub-group. Each group contains an odd number of pairs of contacts (11 pairs or 22 contacts). The lowest common multiple of the number of elements per group and per sub-group is in this case the number of elements in two groups (44) and the repeat in consequence comprises this number as illustrated. In other respects also, this example presents the same possibilities and advantages as the example shown in Figures 8 and 9. It would also be possible in both these examples as in Figure 4 to make the contacts integrally with the elements if desired. Four element ends are associated with each pair of contacts and it is always possible for two of them to present extensions which would constitute the two contacts.

It will be understood that connecting strips for wiring up two-motion selector switch banks of conventional construction can be made as described with reference to Figures 8 to 11. The only differences will be that the dimensions will be different and that in place of the contacts 41, 42 or 47, members better adapted for making connections, e. g. wires or wire loops will be used.

In all cases as above mentioned, although the punching of foil is the preferred method of producing the conductive pattern, printed circuit or similar methods as described for example in my prior patent and applications may be used. With these methods bridge-pieces and the like are dispensed with. It is also possible to dispense with such temporary incompleteness of the pattern in the case of foil by stamping the final pattern out of foil while it is secured on a suitable base and transferring it on to a supporting sheet thereafter. It is also possible particularly if a stouter supporting sheet is used, to cut the foil while it is on the sheet by a press operation, embossing or dinking for instance, and stripping off the unwanted portions either manually or by the help of the tool. However, if the quantities justify the tooling costs the production method described in detail is preferred and it is possible to effect all the steps automatically to the extent of devising a succession of tools to which the strip is conveyed in turn with or without intermediate inspection or storage and so forth.

In general it has been assumed above that the repeat of the pattern was to be regularly spaced over the whole length of the strip, as for example for use with successive regularly spaced switches; indeed for standard spacings it is possible to produce the strip in indefinite lengths and to cut off pieces containing an appropriate number of groups for a particular installation of equipment. Also connections at the ends of the strip have been but briefly referred to. Taking the end connections first, it was suggested that the foil should be cut along the last element of a group of connections and along the $x$ axis (or along line $y_2$) so that the strip shows at its end a row of foil ends along the back edge provided with holes in which were soldered wires or tags. This back edge may, if desired, be stiffened by a straight piece of laminate inserted similarly to the core at this region. If from these foil ends connection has to be made to other parallel banks, connection strips in accordance with the invention may be used for this purpose arranged perpendicularly to the banks to be connected and ending finally in a terminal board. If connection is desired to a cable running away from a rack the cable wires may be connected to the foil ends. It is also possible to avoid a joint between parallel banks and run the strip itself constituting one bank to the next bank if the directions in the next bank are either fully reversed or only horizontally reversed. In the former case a simple loop or bend in the flexible strip, in the latter case a helical loop or bend in the strip, can carry the connection over. In both cases the regularity of spacing of the repeats may need to be suspended at least over the length of the loop and in the latter case the foil beyond the loop is folded in the reverse direction to the fold in front of the loop in order to bring the contacts to the other side of the helical loop and in the right place on the next bank.

Irregularity in the spacing of the repeats is also required, for instance in cases where switches or the like are spaced irregularly because of other pieces of equipment of varying dimensions arranged between them or if the flexible strip has to go round obstacles of varying dimensions in passing from one switch or the like to the next. In all these cases the foil and supporting strip may be shaped according to the final form of the strip and the half of the pattern from the $x$ axis to the arc $r_1$ is punched at the required areas as if the $x$ axis had been divided into two axes $x_1$ and $x_2$.

Then or previously, a series of parallel slots is made in the foil, forming separate conductors from $x_1$ to $x_2$ and uniting both halves of the pattern. Depending on the quantity required these parallel slots may be made by a press tool or by slotting discs or hand tools guided by suitable jigs. If the pattern is printed by one of the alternative methods indicated above the parallel slots may be printed or drawn accordingly. The further steps are more or less the same as for the regular repeat strips.

It is to be understood that though for the sake of clarity a group containing only five elements is shown in Figures 1 and 2, only ten elements in Figures 8 and 9 and only twenty-two elements in Figures 10 and 11, the invention is not limited to such numbers, but can be used for groups of just as large numbers as are possible with conventional switch bank construction and wiring. It is also to be emphasised that the invention is not limited to the particular forms described by way of example, but includes all variations within the scope of the appended claims.

I claim:

1. A continuous flat multi-conductor strip for the interconnection of units of electrical equipment, comprising a continuous layer of insulation, a plurality of flat section conductive elements of substantially V form secured firmly upon said layer with their axes transversely to the length of the strip and with the two limbs of each element lying flat on opposite faces of said layer and so spaced longitudinally of the strip as to form an identically repeating pattern of groups of elements, each group being adapted to be associated with a unit set of terminals of the equipment to be connected and in each of which groups the spacing and securing to said layer cause the end portion of one element of one group to overlap the beginning of the corresponding element of the next group while each limb of an element crosses but is insulated by said layer from all other elements lying between it and the corresponding element of the next group, and means mechanically and electrically binding together the corresponding elements of next adjacent groups into a series of elements with the joints on a line extending longitudinally of the strip at the said overlapping ends, whereby each series of elements constitutes a separate insulated conductor of substantially zig-zag conformation extending generally longitudinally of the strip but crossing it substantially from side to side in flat form on opposite faces alternately of said layer which extends continuously and in one piece over a plurality of groups.

2. A multi-conductor cable strip for interconnecting units of electric equipment, the said cable strip comprising an elongated continuous strip of insulation material, a plurality of substantially V-shaped metal foil elements bonded flat to the surfaces of opposite sides of said insulation strip longitudinally spaced thereon and in fixed relative positions to each other, the two limbs of each V-shaped element straddling the two sides of the insulation strip, the said elements forming a plurality of identically repeating groups the individual elements of which are disposed in a spatial relationship in which the respective ends of corresponding elements in adjacent groups are superposed on opposite sides of the insulation strip and in which each limb of the elements of each group crosses a limb of each element between a respective limb and the corresponding element in an adjacent group situated on the side of the strip opposite to the respective crossing limb, and connection means electrically and mechanically joining the superposed ends of corresponding elements of adjacent groups in a plurality of conductors insulated from each other and of substantially zig-zag configuration extending generally longitudinally of the insulation strip and crossing the width of the strip on opposite sides thereof, the said connection means being situated generally along the line longitudinally of the strip and said superposed ends of the elements.

3. A blank for a multi-conductor cable strip adapted to coact with a selector switch of the kind performing a hunting movement during a selecting operation, the said blank comprising an elongated continuous strip of insulation material, a multitude of elongated contact elements made of metal foil bonded flat to one side of said insulation strip, the said contact elements extending generally parallel to each other substantially across the width of the strip at an angle to the longitudinal axis of the strip and being arranged in form of a plurality of identically repeating groups, the ends of the elements in each group forming contacts adapted to coact with said selector switch, the contact elements in each group being arranged in pairs, each element of alternate pairs being formed on one end with an extension extending about the respective end of the other element of the pair and ending in juxtaposition with an element of the next adjacent pair, the said extensions of each respective pair being disposed at opposite sides of the elements.

4. A blank as defined in claim 3, wherein the said insulation strip is longitudinally foldable along an axis midway between its longitudinal edges.

5. A blank for a multi-conductor cable strip adapted to coact with a selector switch of the kind performing a rotary hunting movement during a selecting operation, the said blank comprising an elongated continuous strip of insulation material, a multitude of elongated contact elements made of metal foil bonded flat to one side of said insulation strip, the said contact elements extending generally parallel to each other substantially across the width of the strip at an angle to the longitudinal axis of the strip and being arranged in form of a plurality of identically repeated groups, the ends of the elements in each group substantially defining two semi-circles facing with their open side the respective longitudinal edge of the strip.

6. A blank for a multi-conductor cable strip adapted to coact with a selector switch of the kind performing a rotary hunting movement during a selecting operation, the said blank comprising an elongated continuous strip of insulation material, a multitude of elongated contact elements made of metal foil bonded flat to one side of said insulation strip, the said contact elements extending generally parallel to each other substantially across the width of the strip at an angle to the transverse axis of the strip and being arranged in form of a plurality of identically repeating groups, the ends of the elements in each group substantially defining two semicircles facing with their open side the respective longitudinal edge of the strip, the contact elements in each group being arranged in pairs, each element of alternate pairs being formed on one end with an extension encompassing the respective end of the other element of the pair and ending in juxtaposition with an element of the next adjacent pair and in the outline of the respective one of the aforesaid semi-circle, the said extensions of each respective pair being disposed at opposite sides of the elements.

7. A blank as defined in claim 6, wherein the said extensions of the contact elements are hook-shaped.

8. A multi-conductor cable strip adapted to coact with a selector switch of the kind performing a hunting movement during a selecting operation, the said cable strip comprising an elongated continuous strip of insulation material, a plurality of substantially V-shaped metal foil elements secured flat to the surfaces of opposite sides of said insulation strip longitudinally spaced thereon and in fixed relative positions to each other, the two limbs of each V-shaped element straddling the two sides of the insulation strip, the said elements forming a plurality of identically repeating groups the individual elements of which are disposed in a spatial relationship in which the respective ends of corresponding elements in adjacent groups are superposed on opposite sides of the insulation strip and in which each limb of the elements of each group crosses a limb of each element in an adjacent group situated on the side of the strip opposite to the respective crossing limb, and connection means electrically and mechanically joining the superposed ends of corresponding elements of adjacent groups in a plurality of conductors insulated from each other and of substantially zig-zag configuration extending generally longitudinally of the insulation strip and crossing the width of the strip on opposite sides thereof, the ends of superposed elements of each group forming contacts adapted to coact with said selector switch, the elements in each group being arranged in pairs, each element of alternate pairs being formed on one end with an extension extending about the respective end of the other element of the pair and ending in juxtaposition with an element of the next adjacent pair, the said extensions of each respective pair being disposed at opposite sides of the elements.

9. A cable strip as defined in claim 2, in combination with electric connecting means secured to each element near the point at which the element straddles the insulation strip.

10. A multi-conductor cable strip adapted to coact with a selector switch of the kind performing a rotary hunting movement during a selecting operation, the said cable strip comprising an elongated continuous strip of insulation material, a plurality of substantially V-shaped metal foil elements secured flat to the surfaces of opposite sides of said insulation strip longitudinally spaced thereon and in fixed relative positions to each other, the two limbs of each V-shaped element straddling the two sides of the insulation strip, the said elements forming a plurality of identically repeating groups the individual elements of which are disposed in a spatial relationship in which the respective ends of corresponding elements in adjacent groups are superposed on opposite sides of the insulation strip and in which each limb of the elements of each group crosses a limb of each element in an adjacent group situated on the side of the strip opposite to the respective crossing limb, the ends of the elements in each group substantially defining two semi-circles facing with their open side the respective longitudinal edge of the strip, and connection means electrically and mechanically joining the superposed ends of corresponding elements of adjacent groups in a plurality of conductors insulated from each other and of substantially zig-zag configuration extending generally longitudinally of the insulating strip and crossing the width of the strip on opposite sides thereof, the said connection means being in form of contact strips electrically connecting for the purpose aforesaid respective superposed ends of the elements and radially oriented relative to the center of the respective semi-circle formed by the said ends of the elements.

PAUL EISLER.

REFERENCES CITED

The following references are of record in the file of this patent:

UNITED STATES PATENTS

| Number | Name | Date |
|---|---|---|
| 1,320,980 | Bowman | Nov. 4, 1919 |
| 1,334,276 | Adams | Mar. 23, 1920 |
| 1,697,221 | Bohme | Jan. 1, 1929 |
| 1,794,831 | Caruso | Mar. 3, 1931 |
| 2,370,846 | Deakin | Mar. 6, 1945 |
| 2,450,974 | Mallina | Oct. 12, 1948 |